US012698896B2

(12) United States Patent (10) Patent No.: US 12,698,896 B2
Safar et al. (45) Date of Patent: Aug. 4, 2026

(54) MONITORING AND MAINTAINING FLARE TIP TEMPERATURES

(71) Applicant: Saudi Arabian Oil Company, Dhahran (SA)

(72) Inventors: Anas H. Safar, Dhahran (SA); Abdulaziz H. Altijani, Al Khobar (SA); Abdullmajeed I. Al Sanad, Dhahran (SA); Fatimah M. Alomair, Dhahran (SA); Turki Ali Al-Garni, Dhahran (SA); Mohammed A. Aljallal, Dhahran (SA); Yousef D. Aloufi, Dhahran (SA); Muhammad M. Khaldi, Dhahran (SA); Hasan Ali Amin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 851 days.

(21) Appl. No.: 17/811,219

(22) Filed: Jul. 7, 2022

(65) Prior Publication Data

US 2024/0011632 A1 Jan. 11, 2024

(51) Int. Cl.
| | |
|---|---|
| *F23N 5/18* | (2006.01) |
| *F23C 7/00* | (2006.01) |
| *F23G 7/08* | (2006.01) |
| *F23L 7/00* | (2006.01) |
| *F23N 5/26* | (2006.01) |
| *G05B 13/04* | (2006.01) |

(52) U.S. Cl.
CPC .............. *F23N 5/184* (2013.01); *F23C 7/008* (2013.01); *F23G 7/085* (2013.01); *F23L 7/005* (2013.01); *F23N 5/265* (2013.01); *G05B*

*13/042* (2013.01); *F23N 2005/185* (2013.01); *F23N 2237/22* (2020.01); *F23N 2241/12* (2020.01)

(58) Field of Classification Search
CPC ........ G05B 13/042; F23L 7/005; F23G 7/085; F23N 5/184; F23N 5/265; F23N 2241/12; F23N 2237/22; F23N 2005/185; F23C 7/008
See application file for complete search history.

(56) References Cited

U.S. PATENT DOCUMENTS

| | | | |
|---|---|---|---|
| 4,202,168 A | 5/1980 | Acheson et al. | |
| 4,227,872 A | 10/1980 | Zink et al. | |

(Continued)

FOREIGN PATENT DOCUMENTS

| | | | | |
|---|---|---|---|---|
| EP | 2309186 | 4/2011 | | |
| EP | 2330347 | 6/2011 | | |
| WO | WO-2015094578 A1 * | 6/2015 | ............... | F23G 5/50 |

OTHER PUBLICATIONS

U.S. Appl. No. 17/486,004, Safar et al., filed Sep. 27, 2021.

(Continued)

*Primary Examiner* — Randy W Gibson
(74) *Attorney, Agent, or Firm* — Fish & Richardson P.C.

(57) ABSTRACT

A data stream indicative of a first set of flare tip parameters is received. A second set of parameters is determined based on the first set of flare tip parameters. A control signal is sent to an actuable device based on the first set of parameters and the second set of parameters. The actuable device is configured to maintain at least one parameter of the first set of parameter and the second set of parameters within a specified range.

16 Claims, 3 Drawing Sheets

300

Receive a Datastream Indicative of a First Set of Flare Tip Parameters — 302

Determine a Second Set of Parameters Based on the First Set of Flare Tip Parameters — 304

Send a Control Signal to an Actuable Device Based on the First Set of Parameters and the Second Set of Parameters — 306

(56) References Cited

U.S. PATENT DOCUMENTS

| | | | |
|---|---|---|---|
| 4,233,596 | A | 11/1980 | Okamoto et al. |
| 4,342,550 | A | 8/1982 | Tuck |
| 4,505,668 | A | 3/1985 | DiBiano et al. |
| 8,138,927 | B2 | 3/2012 | Diepenbroek et al. |
| 8,629,313 | B2 | 1/2014 | Hong et al. |
| 8,967,995 | B1 | 3/2015 | Griffin et al. |
| 9,594,359 | B2 | 3/2017 | Mohideen et al. |
| 9,677,762 | B2 | 6/2017 | Tullos |
| 10,000,704 | B2 | 6/2018 | Young et al. |
| 10,029,291 | B2 | 7/2018 | Fischer et al. |
| 11,859,815 | B2 | 1/2024 | Al-Shaiji et al. |
| 2003/0069743 | A1 | 4/2003 | Nordrum |
| 2010/0070404 | A1 | 3/2010 | McConnell |
| 2014/0266740 | A1 | 9/2014 | Fernandes et al. |
| 2015/0260397 | A1 | 9/2015 | Talasila et al. |
| 2017/0292077 | A1 | 10/2017 | Young et al. |
| 2017/0370579 | A1 | 12/2017 | Johnson et al. |
| 2019/0242575 | A1 | 8/2019 | Fisher et al. |
| 2019/0366400 | A1 | 12/2019 | Chambers et al. |
| 2020/0386404 | A1 | 12/2020 | Kraus et al. |
| 2021/0372864 | A1 | 12/2021 | Tao et al. |
| 2023/0096405 | A1 | 3/2023 | Safar et al. |
| 2023/0128460 | A1 | 4/2023 | Safar et al. |

OTHER PUBLICATIONS bakerhughesds.com [online], "Flare gas measurement & control solutions," 2021, retrieved Aug. 9, 2021 from URL<https://www.bakerhughesds.com/panametrics/flare-management>, 11 pages.

Boneu et al., "How and when to monitor a patient treated with low molecular weight Heparin," Seminars in Thrombosis and Hemostasis, Oct. 2001, 27(5):519-522, 4 pages.

Compendium of Greenhouse Gas Emissions Methodologies for the Oil and Natural Gas Industry, American Petroleum Institute, Aug. 2009, 807 pages.

Eddleman et al., "Flare monitoring regulatory compliance and analyzers: An analysis," Yokogawa, 2018, 4 pages.

Engineering Data Book, The Gas Processor Suppliers Association (GPSA), 12th Edition, vol. 1, Chapter 5: Relief Systems, 2004, 25 pages.

Gilmer et al., "Draft flare waste gas flow rate and composition measurement methodologies evaluation document," Texas Commission on Environmental Quality, Work Assignment 5, Shell Global Solutions, available on or before Jun. 2013 via Internet Archive Wayback Machine URL <https://web.archive.org/web/20131101000000*/https://www.tceq.texas.gov/assets/public/implementation/air/am/contracts/reports/oth/FLARE_WASTE_GAS_FLOW_RATE.pdf>, 141 pages.

Mandatory Greenhouse Gas Reporting, 40 CFR § 98, Chapter I, Subchapter C, Oct. 2009, 581 pages.

Moorman et al., "Lower heating value sensor for fuel monitoring," IEEE Sensors, 2005, 802-805, 4 pages.

Sick, "Flowsic100 Flare: Reliable gas flow measurement in flare gas applications," Oct. 2021, retrieved Jul. 13, 2022, retrieved from URL <https://www.bakerhughesds.com/panametrics/sensors-probes-transducers-transmitters/oil-and-gas/panametrics-flare>, 5 pages.

sick.com [online], "Gas flow measuring instruments FLOWSIC100 Flare," 2021, retrieved Aug. 9, 2021 from URL<https://www.sick.com/th/en/flow-measurement-technology/gas-flow-measuring-instruments/flowsic 100-flare/c/g198253>, 7 pages.

thermofisher.com [online], "Flare stack emission monitoring," Available on or before May 4, 2021, via Internet Archive Wayback Machine URL <https://web.archive.org/web/20210420073913/https://www.thermofisher.com/us/en/home/industrial/manufacturing-processing/flare-stack-emission-monitoring.html>, retrieved on Oct. 12, 2021, retrieved from URL <https://www.thermofisher.com/sa/en/home/industrial/manufacturing-processing/flare-stack-emission-monitoring.html>, 4 pages.

Zeng et al., "Validation of a new method for measuring and continuously monitoring the efficiency of industrial flares," Journal of the Air & Waste Management Association, 2016, 66(1):76-86, 12 pages.

PCT International Search Report and Written Opinion in International Appln. No. PCT/US2022/077028, dated Jan. 23, 2023, 12 pages.

PCT International Search Report and Written Opinion in International Appln. No. PCT/US2023/026336, dated Oct. 10, 2023, 12 pages.

Umukoro et al., "Modelling emissions from natural gas flaring," Journal of King Saud University—Engineering Sciences, 2017, 29:178-182, 5 pages.

PCT International Search Report and Written Opinion in International Appln. No. PCT/US2022/077030, dated Jan. 30, 2023, 14 pages.

PCT International Search Report and Written Opinion in International Appln. No. PCT/US2022/078596, dated Feb. 2, 2023, 15 pages.

* cited by examiner

MONITORING AND MAINTAINING FLARE TIP TEMPERATURES

TECHNICAL FIELD

This disclosure relates to flare tip monitoring.

BACKGROUND

During hydrocarbon production and processing, a flare tip is used to safely burn excess hydrocarbons during production or process irregularities. The flare tip is mounted at a sufficient height and distance to reduce radiation exposure to the workers and to reduce the likelihood of atmospheric hydrocarbon ignition as the flare tip is a potential ignition source. The flame at the flare tip burns at a temperature high enough that the flame cannot often be directly measured.

SUMMARY

This disclosure describes technologies relating to monitoring and maintaining flare tip temperatures.

An example implementation of the subject matter described within this disclosure is a method with the following features. A data stream indicative of a first set of flare tip parameters is received. A second set of parameters is determined based on the first set of flare tip parameters. A control signal is sent to an actuable device based on the first set of parameters and the second set of parameters. The actuable device is configured to maintain at least one parameter of the first set of parameter and the second set of parameters within a specified range.

Aspects of the example method, which can be combined with the example method alone or in combination with other aspects, include the following. The first set of parameters include a flare mass flow rate and a flare mass flow composition.

Aspects of the example method, which can be combined with the example method alone or in combination with other aspects, include the following. The second set of parameters includes an adiabatic flame temperature or a theoretical flame temperature.

Aspects of the example method, which can be combined with the example method alone or in combination with other aspects, include the following. Determining the second set of parameters includes determining the adiabatic flame temperature. The adiabatic flame temperature is determined with the following equation:

$$T_{ad} = T_{\oplus} + LHV_{molar}/\Sigma V_i C_{pi}$$

where $T_{ad}$ is the adiabatic flame temperature in degrees Kelvin (K), $T_{\oplus}$ is 298 K, $LHV_{molar}$ is the lower heating value of a composition of the mass flow in molar basis, $V_i$ are molar coefficients, and $C_{pi}$ are molar thermal capacities.

Aspects of the example method, which can be combined with the example method alone or in combination with other aspects, include the following. Determining the second set of parameters includes determining the theoretical flame temperature. The theoretical flame temperature is determined by the following equation:

$$T = 60 + \left( \frac{NHV}{0.325 \ (1 + 1 + EA)(7.5 \times 10^{-4})(NHV)} \right)$$

where T is a temperature in degrees Fahrenheit, NHV is a Net Heating Valve of hydrocarbon stream in British Thermal Units per pound of excess air, and where $$EA = \frac{0.95Y}{21 - Y}.$$

Aspects of the example method, which can be combined with the example method alone or in combination with other aspects, include the following. A prediction of steam usage is determined. The prediction of steam usage is determined by the following equation:

$$W(steam) = W[0.68 - (10.8/MW)]$$

where W (steam) is a flowrate of steam in pounds per hour, W is the flowrate of the flared gas, and where MW is a molecular weight of hydrocarbon gas in the mass flow in pounds per pound-mole.

Aspects of the example method, which can be combined with the example method alone or in combination with other aspects, include the following. Steam flow is regulated by the control signal. The control signal is determined based upon the prediction of steam usage.

Aspects of the example method, which can be combined with the example method alone or in combination with other aspects, include the following. The actuable device is an air blower, actuation of the air blower being controlled by the control signal.

Aspects of the example method, which can be combined with the example method alone or in combination with other aspects, include the following. Values of the first set of parameters and the second set of parameters are stored within a database.

An example implementation of the subject matter described within this disclosure is a flare system with the following features. A flare header directs flare gas towards a flare tip. An actuable device is arranged and configured to add mass flow to a flare stream flowing through the flare header towards the flare tip. A controller coupled to the actuable device. The controller is configured to receive a data stream indicative of a first set of flare tip parameters. The controller is configured to determine a second set of parameters based on the first set of flare tip parameters. The controller is configured to send a control signal to an actuable device based on the first set of parameters and the second set of parameters. The actuable device is configured to maintain at least one parameter of the first set of parameters and the second set of parameters within a specified range.

Aspects of the example flare system, which can be combined with the example flare system alone or in combination with other aspects, include the following. The actuable device includes a steam supply.

Aspects of the example flare system, which can be combined with the example flare system alone or in combination with other aspects, include the following. The actuable device includes an air blower.

Aspects of the example flare system, which can be combined with the example flare system alone or in combination with other aspects, include the following. The first set of parameters include a flare mass flow rate and a flare mass flow composition.

Aspects of the example flare system, which can be combined with the example flare system alone or in combination with other aspects, include the following. The second set of parameters includes an adiabatic flame temperature or a theoretical flame temperature.

Aspects of the example flare system, which can be combined with the example flare system alone or in combination with other aspects, include the following. Determining the second set of parameters includes determining the adiabatic flame temperature. The adiabatic flame temperature is determined with the following equation:

$$T_{ad} = T_{\oplus} + LHV_{molar} / \Sigma V_i C_{pi}$$

where $T_{ad}$ is the adiabatic flame temperature in degrees Kelvin (K), TED is 298 K, $LHV_{molar}$ is the lower heating value of a composition of the mass flow in molar basis, $V_i$ are molar coefficients, and $C_{pi}$ are molar thermal capacities.

Aspects of the example flare system, which can be combined with the example flare system alone or in combination with other aspects, include the following. Determining the second set of parameters includes determining the theoretical flame temperature. The theoretical flame temperature is determined by the following equation:

$$T = 60 + \left( \frac{NHV}{0.325 \ (1 + 1 + EA)(7.5 \times 10^{-4})(NHV)} \right)$$

where T is a temperature in degrees Fahrenheit, NHV is a Net Heating Valve of hydrocarbon stream in British Thermal Units per pound of excess air, and where $$EA = \frac{0.95Y}{21 - Y}.$$

Particular implementations of the subject matter described in this disclosure can be implemented so as to realize one or more of the following advantages. The subject matter described herein allows for flare monitoring and extension of flare service life. In addition, the subject matter described herein can help enhance combustion and smokeless operation. Such enhancement can reduce the required steam and air for the flare operation, and hence, reduce the required energy and associated CO 2 from the flare combustion and source of utilities (for example, steam, and air).

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Heat intensity, thermal cycling, and smoke production are all factors that impact a resulting lifespan of a flare tip. Monitoring flare tip properties during operation and actively maintaining such properties increases flare tip lifespans when compared to running a flare without monitoring.

This disclosure relates to such monitoring practices. For example, a flare tip temperature is monitored based on a first set of flare parameters. This first set of flare parameters is used to determine a second set of flare parameters. An actuable device is then controlled based on the first set of parameters and the second set of parameters to maintain the flare tip within a specified operating range.

Figure 1:
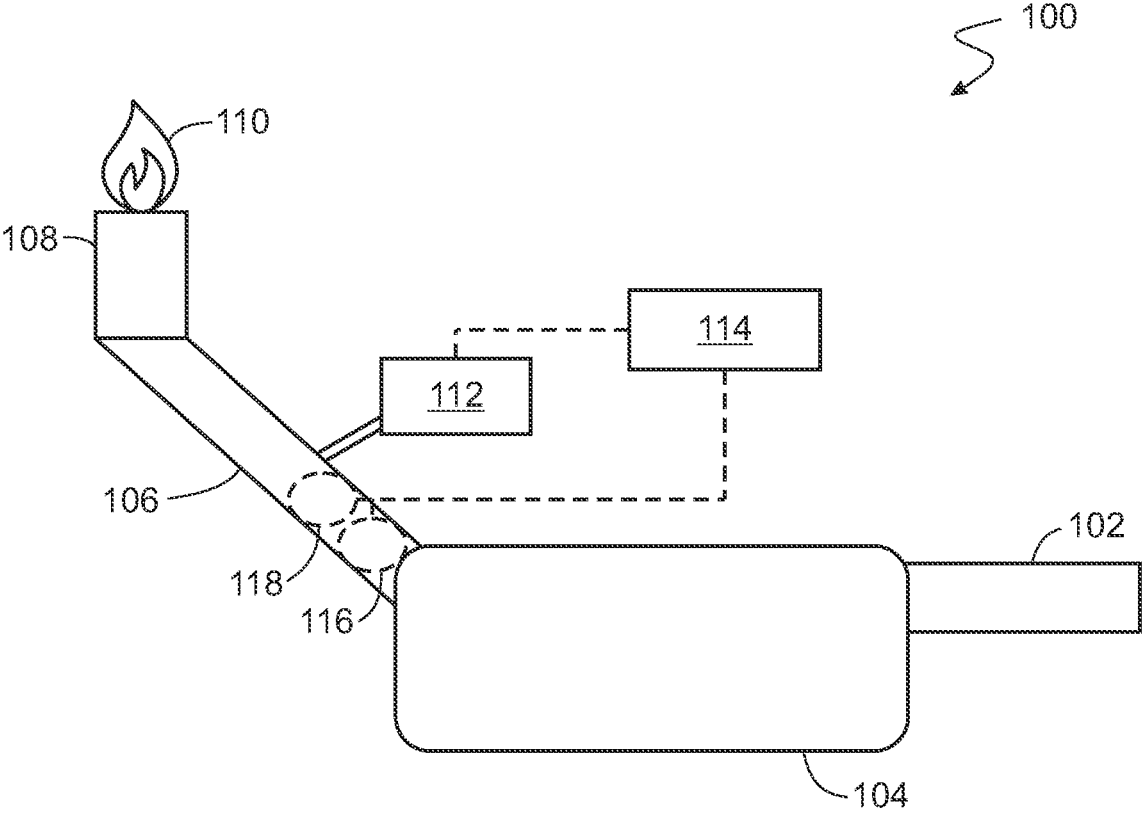
FIG. 1 is a schematic diagram of an example flare system.

FIG. 1 is a schematic diagram of an example flare system 100. The flare system 100 includes a flare header 102 that feeds into a knock-out drum 104. The knock-out drum 104 allows liquids to drop out of the flare header 102 prior to gasses in the flare header 102 moving to the flare supply line 106. The flare supply line 106 supplies flare gas to the flare tip 108, where it is ignited and burned off with a flare flame 110. The flare tip 108 is located at a sufficient height and distance from workers to reduce the risk of burns from radiation emitted from the flare flame 110. The flare tip 108 itself is designed for a specified range of fuel consumption rates (for example, flare gas), fuel compositions, and temperatures. Exceeding these specified ranges, in some instances, shortens a lifespan of the flare tip 108.

In some implementations, the flare system 100 includes an actuable device 112 arranged and configured to add mass flow to a flare stream flowing through the flare header 102 towards the flare tip 108. The additional mass flow is used to regulate the flare flame 110 temperature, reduce smoke from the flare tip 108, or a combination of the two. Examples of such actuable devices 112 include a steam supply and an air blower. In some implementations, such actuable devices are controlled by a controller 114.

Within the flare header 102 of flare supply line 106 is a flow meter 116 that is used, in conjunction with a known composition of the flare gas, to measure or determine a mass flow rate. That is, the flow meter 116 sends a signal, or data stream, indicative of a mass flow rate. The flow meter 116 is coupled to a controller 114. In some implementations, composition of the flare gas is determined through regular testing or with an in-line gas chromatograph 118. In implementations that use an in-line gas chromatograph 118, the in-line gas chromatograph 118 sends a signal, or data stream, indicative of a mass flow composition of the flare gas.

Figure 2:
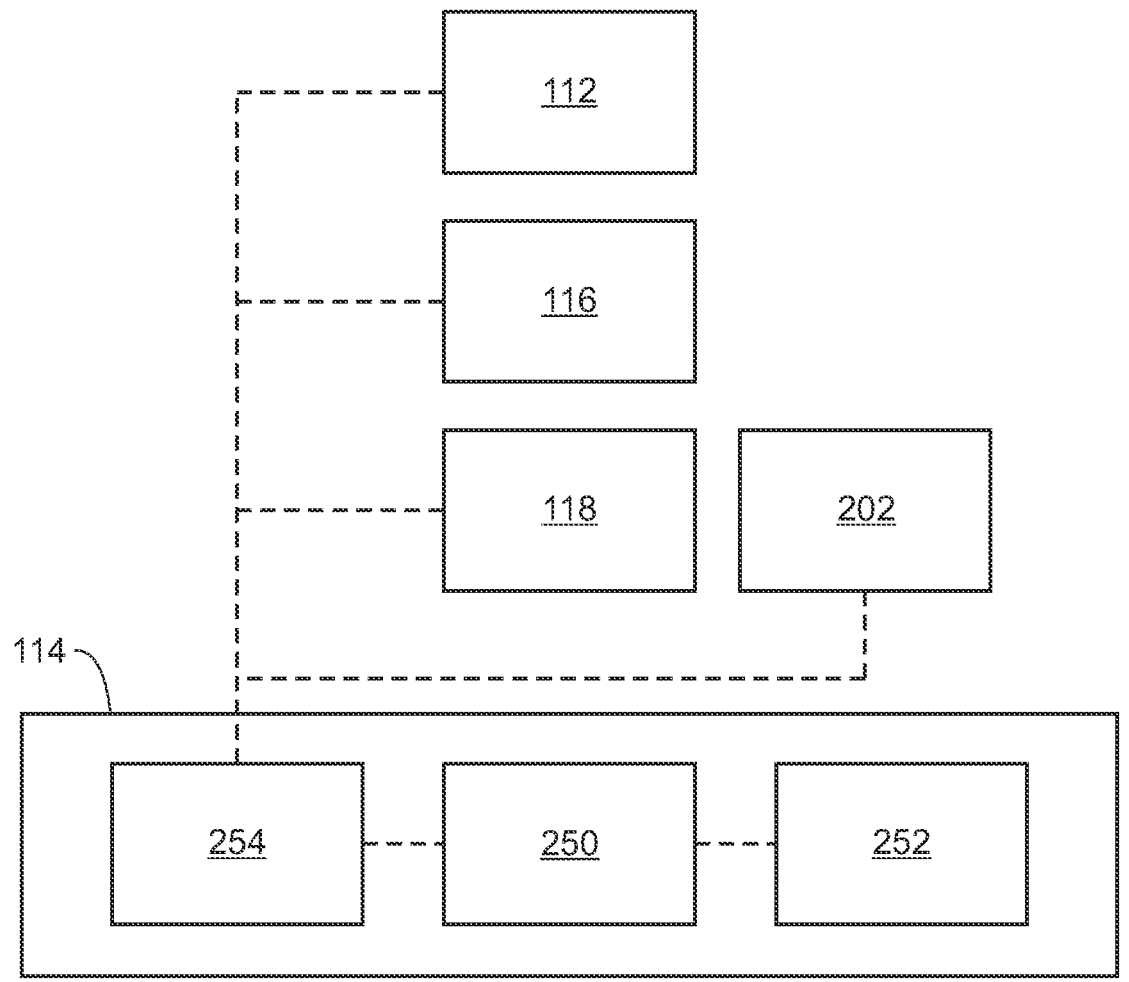
FIG. 2 is a schematic diagram of an example controller that can be used with aspects of this disclosure.

FIG. 2 is a schematic diagram of an example controller that can be used with aspects of this disclosure. The controller 114 can, among other things, monitor parameters of the system and send signals to actuate and/or adjust various operating parameters of the flare system 100. As shown in FIG. 2, the controller 114, in certain instances, includes a processor 250 (e.g., implemented as one processor or multiple processors) and a memory 252 (e.g., implemented as one memory or multiple memories) containing instructions that cause the processors 250 to perform operations described herein. The processors 250 are coupled to an input/output (I/O) interface 254 for sending and receiving communications with components in the system, including, for example, sensors, such as the flow meter 116 or the gas chromatograph 118, or a remote database 202 that stores values for the first set of parameters or the second set of parameters. In certain instances, the controller 114 can additionally communicate status with and send actuation and/or control signals to one or more of the various system components (including an actuator system, such the actuable device 112) of the flare system 100, as well as other sensors (e.g., pressure sensors, temperature sensors, vibration sensors, and other types of sensors) provided in the flare system 100. In certain instances, the controller 114 can communicate status and send actuation and control signals to one or more of the components within the flare system 100 such as the actuable device 112. The communications can be hard-wired, wireless, or a combination of wired and wireless. In some implementations, controllers similar to the controller 114 can be located elsewhere, such as in a data van, elsewhere on a site or even remote from the site. In some implementations, the controller 114 can be a distributed controller with different portions located about a site or off site. For example, in certain instances, the controller 114 can be located in proximity to the components of the system 100, or it can be located in a separate control room or data van. Additional controllers can be used throughout the site as stand-alone controllers or networked controllers without departing from this disclosure.

The controller 114 can operate in monitoring, commanding, and using the system 100 to monitor and adjust flare tip 108 conditions. To monitor and control the system 100, the controller 114 is used in conjunction with the sensors 116 and 118. Input and output signals, including the data from the sensors, controlled and monitored by the controller 114, can be logged continuously by the controller 114.

The controller 114 can have varying levels of autonomy for controlling the system 100. For example, the controller 114 can begin sensing parameters that indicate smoke production or high temperatures at the flare tip, and an operator adjusts the actuable device 112, for example, by changing an airflow rate of a blower or a steam injection rate. Alternatively, the controller 114 can begin sensing such parameters, receive an additional input from an operator, and begin adjusting the actuable device 112 with no other input from an operator. Alternatively, the controller 114 can begin sensing the parameters and adjust the actuable device 112 with no input from an operator.

In operation, the controller 114, coupled to the actuable device 112, receives a data stream indicative of a first set of flare tip parameters, for example, a mass flow rate of the flare gas or a composition of the flare gas. The controller 114 also determines a second set of parameters based, at least in part, on the first set of flare tip parameters, for example, a flare temperature (adiabatic or theoretical). The controller 114 then sends a control signal to an actuable device 112 based on the first set of parameters and the second set of parameters. The actuable device 112 is configured to maintain or adjust at least one parameter of the first set of parameters and the second set of parameters within a specified range, for example, a flare temperature can be adjusted by changing an amount of steam or air added to the flare stream.

Figure 3:
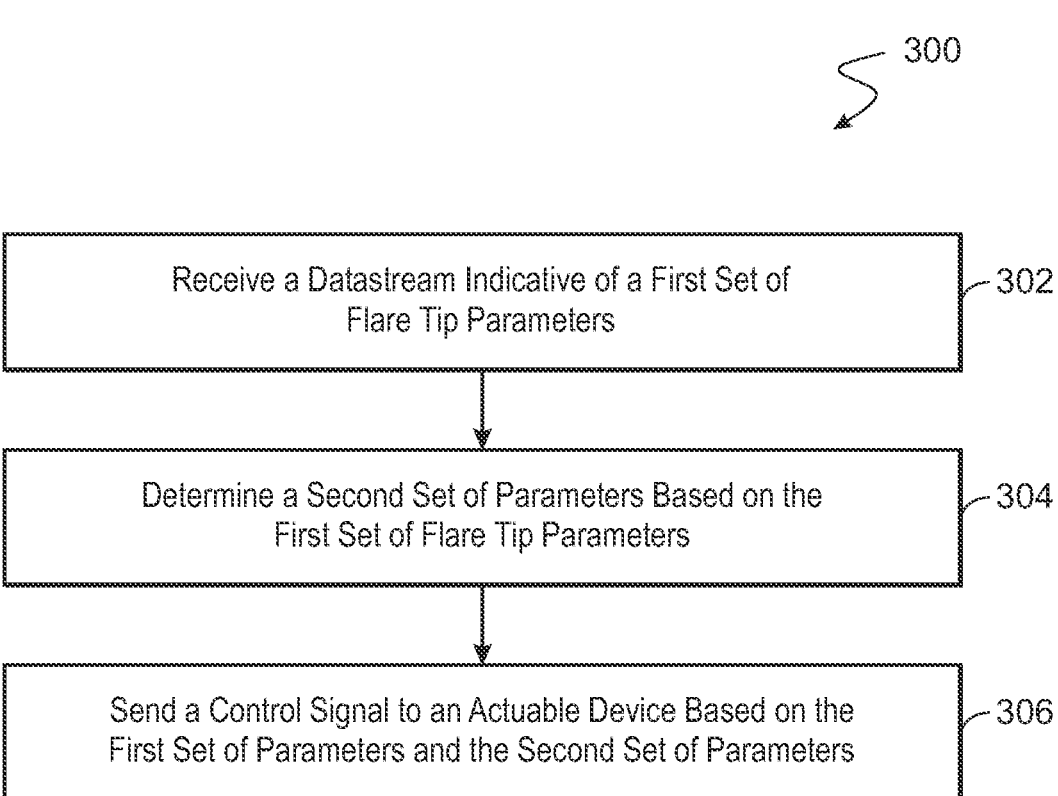
FIG. 3 is a flowchart of an example method that can be used with aspects of this disclosure.

FIG. 3 is a flowchart of an example method 300 that can be used with aspects of this disclosure. In some implementations, all or part of the following method steps are performed by the controller 114. At 302, a data stream indicative of a first set of flare tip parameters is received. In some implementations, the first set of parameters includes a present flare mass flow rate, a present flare mass flow composition, a specified range of fuel consumption rates (for example, flare gas), a specified range of fuel compositions, and a specified range of flare tip temperatures (adiabatic or theoretical).

At 304, a second set of parameters is determined, in part, based on the first set of flare tip parameters. In some implementations, the second set of parameters includes an adiabatic flame temperature, a theoretical flame temperature, or both. In instances where the adiabatic flame temperature is determined, the adiabatic flame temperature is determined with the following equation:

$$T_{ad} = T_{\oplus} + LHV_{molar} / \Sigma V_i C_{pi} \qquad \text{EQ. (1)}$$

6 where $T_{ad}$ is the adiabatic flame temperature in degrees Kelvin (K), $T\oplus$ is 298 K, $LHV_{molar}$ is the lower heating value of a composition of the mass flow in molar basis, $V_i$ are molar coefficients, and $C_{pi}$ are molar thermal capacities. In some implementations, $LHV_{molar}$, $V_i$, and $C_{pi}$ are determined based on the composition of the mass flow.

In implementations where the theoretical flame temperature is determined, the theoretical flame temperature is determined by the following equation:

$$T = 60 + \left( \frac{NHV}{0.325 \ (1 + 1 + EA)(7.5 \times 10^{-4})(NHV)} \right) \qquad \text{EQ. (2)}$$

where T is a temperature in degrees Fahrenheit, NHV is a Net Heating Valve of hydrocarbon stream in British Thermal Units per pound of excess air, and where EA is determined by the following equation:

$$EA = \frac{0.95Y}{21 - Y} \qquad \text{EQ. (3)}$$

where Y s a dry molar percentage of $O_2$.

In some implementations, the values of the first set of parameters, the second set of parameters, or both, are stored within the database 202 or look-up table. In such implementations, the database can be located in a variety of locations, for example, locally on the memory 252 of the controller 114, remotely at a separate location, or in a separate memory located at the flare site.

At 306, a control signal is sent, for example, from the controller 114, to an actuable device 112 based on the first set of parameters and the second set of parameters. The actuable device 112 is configured to maintain or adjust (per the control signal) at least one parameter of the first set of parameters or the second set of parameters within a specified range. For example, additional steam or air can be added to the mass flow stream feeding the flare tip to adjust smoke production, flare temperature, or both.

In implementations where steam is used, steam usage is predicted with the following equation:

$$W(\text{steam}) = W[0.68 - (10.8/MW)] \qquad \text{EQ. (4)}$$

where W is a flowrate of flare gas in pounds per hour, where W (steam) is the flowrate of steam, and where MW is a molecular weight of hydrocarbon gas in the mass flow in pounds per pound-mole. In some implementations, a flow of steam is regulated by the controller, more specifically, by the control signal sent from the controller 114 to the steam source. Alternatively, or in addition, the actuable device includes an air blower. In such implementations, a flow rate of air by the blower is regulated by the controller 114, more specifically, by the control signal sent from the controller 114 to the blower.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method comprising:
receiving, from a flow meter, a data stream indicative of a first set of flare tip parameters, the flow meter being included in a flare supply line supplying flare gas to a flare tip;
determining a second set of parameters based on the first set of flare tip parameters, wherein the second set of parameters comprises an adiabatic flame temperature derived by adding a reference temperature to a ratio of a lower heating value of a composition of the data stream based on a molar flow to a sum of molar coefficients and molar heat capacities;
determining mass flow based on the first set of parameters and the second set of parameters;
determining an adjustment of the mass flow for maintaining at least one parameter of the first set of parameter and the second set of parameters within a specified range;
generating a control signal for actuating an actuable device, the control signal comprising the adjustment of the mass flow to a flare stream directed from a flare header through a knock-out drum, the knock-out drum filtering liquids prior to supplying flare gas to a flare supply line guiding the flare gas towards the flare tip actuating the actuable device; and
regulating the flare flame at the flare tip by actuating the actuable device using the control signal.

2. The computer-implemented method of claim 1, wherein the first set of parameters comprises:
flare mass flow rate; and
flare mass flow composition.

3. The computer-implemented method of claim 2 wherein the second set of parameters comprises an adiabatic flame temperature, or a theoretical flame temperature.

4. The computer-implemented method of claim 3, wherein determining the second set of parameters comprises determining the adiabatic flame temperature, wherein the adiabatic flame temperature is determined by:

$$T_{ad}=T_{\oplus}+LHV_{molar}/\Sigma v_i c_{pi},$$

where $T_{ad}$ is the adiabatic flame temperature in degrees Kelvin (K), $T_{\oplus}$ is 298 K, $LHV_{molar}$ is a lower heating value of a composition of the mass flow in molar basis, $V_i$ are molar coefficients, and $C_{pi}$ are molar thermal capacities.

5. The computer-implemented method of claim 3, wherein determining the second set of parameters comprises determining the theoretical flame temperature, wherein the theoretical flame temperature is determined by:

$$T = 60 + \left( \frac{NHV}{0.325 \ (1 + 1 + EA)(7.5 \times 10^{-4})(NHV)} \right),$$

where T is a temperature in degrees Fahrenheit, NHV is a Net Heating Valve of hydrocarbon stream in British Thermal Units per pound of excess air, and where $$EA = \frac{0.95Y}{21 - Y}.$$

6. The computer-implemented method of claim 2, further comprising determining a prediction of steam usage, wherein the prediction of steam usage is determined by:

$$W(\text{steam})=W[0.68-(10.8/MW)],$$

where W is a flowrate of steam in pounds per hour, and where MW is a molecular weight of hydrocarbon gas in the mass flow in pounds per pound-mole.

7. The computer-implemented method of claim 6, wherein steam flow is regulated by the control signal, the control signal being determined based upon the prediction of steam usage.

8. The computer-implemented method of claim 1, wherein the actuable device is an air blower, actuation of the air blower being controlled by the control signal.

9. The computer-implemented method of claim 1, further comprising storing values of the first set of parameters and the second set of parameters within a database.

10. A flare system comprising:
a flare tip;
a flare header directing a flare stream through a knock-out drum filtering liquids prior to supplying a flare gas through a flare supply line guiding the flare gas towards the flare tip;
an actuable device arranged and configured to add mass flow to the flare stream flowing through the flare header towards the flare tip; and
a controller coupled to the actuable device, the controller configured to:
receive a data stream indicative of a first set of flare tip parameters;
determine a second set of parameters based on the first set of flare tip parameters, wherein the second set of parameters comprises an adiabatic flame temperature derived by adding a reference temperature to a ratio of a lower heating value of a composition of the data stream based on a molar flow to a sum of molar coefficients and molar heat capacities; and
send a control signal to an actuable device based on the first set of parameters and the second set of parameters, the actuable device configured to maintain at least one parameter of the first set of parameters and the second set of parameters within a specified range.

11. The flare system of claim 10, wherein the actuable device comprises a steam supply.

12. The flare system of claim 10, wherein the actuable device comprises an air blower.

13. The flare system of claim 10, wherein the first set of parameters comprises:

a flare mass flow rate; and a flare mass flow composition.

14. The flare system of claim 10, wherein the second set of parameters comprises a theoretical flame temperature.

15. The flare system of claim 14, wherein the adiabatic flame temperature is determined by:

$$T_{ad}=T_{\oplus}+LHV_{molar}/\Sigma v_i c_{pi},$$

where $T_{ad}$ is the adiabatic flame temperature in degrees Kelvin (K), $T_{\oplus}$ is 298 K, $LHV_{molar}$ is the lower heating value of a composition of the mass flow in molar basis, $V_i$ are the molar coefficients, and $C_{pi}$ are molar thermal capacities.

16. The flare system of claim 14, wherein determining the second set of parameters comprises determining the theoretical flame temperature, wherein the theoretical flame temperature is determined by:

$$T = 60 + \left(\frac{NHV}{0.325\ (1+1+EA)(7.5\times10^{-4})(NHV)}\right),$$

where T is a temperature in degrees Fahrenheit, NHV is a Net Heating Valve of hydrocarbon stream in British Thermal Units per pound of excess air, and where $$EA = \frac{0.95Y}{21-Y}.$$

\* \* \* \* \*